United States Patent
Bensberg

(10) Patent No.: US 12,536,147 B2
(45) Date of Patent: *Jan. 27, 2026

(54) LOCK-FREE READ ACCESS TO HASH MAP DATA STRUCTURES

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,720

(22) Filed: Jun. 28, 2024

(65) Prior Publication Data

US 2025/0005012 A1    Jan. 2, 2025

Related U.S. Application Data

(63) Continuation of application No. 18/214,827, filed on Jun. 27, 2023, now Pat. No. 12,061,592.

(51) Int. Cl.
    *G06F 16/23*       (2019.01)
(52) U.S. Cl.
    CPC ................................ *G06F 16/2322* (2019.01)
(58) Field of Classification Search
    None
    See application file for complete search history.

(56) References Cited

U.S. PATENT DOCUMENTS

| | | | |
|---|---|---|---|
| 8,661,005 B2 | 2/2014 | McKenney et al. | |
| 9,304,998 B2 * | 4/2016 | Diaconu | G06F 16/219 |
| 2003/0055807 A1 * | 3/2003 | Lomet | G06F 16/2477 |
| 2004/0107227 A1 | 6/2004 | Michael | |

(Continued)

FOREIGN PATENT DOCUMENTS

| | | | | |
|---|---|---|---|---|
| EP | 0506321 A2 * | 9/1992 | .......... | G06F 11/1471 |
| EP | 3026582 A1 * | 6/2016 | ......... | G06F 16/2322 |
| WO | WO 2016/064575 A1 | 4/2016 | | |

OTHER PUBLICATIONS

Michael MM. Safe memory reclamation for dynamic lock-free objects using atomic reads and writes. In Proceedings of the twenty-first annual symposium on Principles of distributed computing Jul. 21, 2002 (pp. 21-30). (Year: 2002).

(Continued)

*Primary Examiner* — Uyen T Le

(74) *Attorney, Agent, or Firm* — Sterne, Kessler, Goldstein & Fox P.L.L.C.

(57) ABSTRACT

Disclosed herein are system, method, and computer program product embodiments for providing a lock-free read access to one or more data structures. An embodiment operates by allocating a first portion of a memory corresponding to a first data structure of the one or more data structures, the first data structure comprising a size. The embodiment then performs a first operation associated with the first data structure. The embodiment then receives a first request to insert second data to the first data structure, and determines whether an increase of the size is to be executed. The embodiment then, based on the determination that an increase of the size is to be executed, inserting the second data to a modified first data structure, comprising: executing garbage collection to free-up the first portion of the memory based on at least one parallel operation associated with the first data structure.

20 Claims, 9 Drawing Sheets

(56) References Cited

U.S. PATENT DOCUMENTS

2011/0252000 A1* 10/2011 Diaconu ............... G06F 16/27
                                                       707/812
2018/0144014 A1*  5/2018 Mittal ............... G06F 16/2322
2018/0218023 A1*  8/2018 Fanghaenel ......... G06F 16/2343
2018/0276122 A1   9/2018 Bensberg et al.
2019/0370247 A1* 12/2019 Eluri .................. G06F 3/0647

OTHER PUBLICATIONS

Gao H, Groote JF, Hesselink WH. Lock-free parallel and concurrent garbage collection by mark&sweep. Science of computer programming. Feb. 1, 2007;64(3):341-74. (Year: 2007).

Osterlund E, Lowe W. Analysis of pure methods using garbage collection. In Proceedings of the 2012 ACM SIGPLAN Workshop on Memory Systems Performance and Correctness Jun. 16, 2012 (pp. 48-57). (Year: 2012).

* cited by examiner

LOCK-FREE READ ACCESS TO HASH MAP DATA STRUCTURES

CROSS REFERENCE TO RELATED APPLICATIONS

This application is a continuation of U.S. application Ser. No. 18/214,827, filed on Jun. 27, 2023, the contents of which are incorporated herein by reference in its entirety.

BACKGROUND

In a database system, when inserting data into a data structure (e.g., a hash map) corresponding to a first portion of a memory, a second portion of the memory may need to be allocated when the data structure grows in size. The first portion of the memory may need to be freed. Parallel threads can be executed in different portions of the database system. Multithreading can enable more than one user at a time without requiring multiple copies of the program running. Because other threads may be ongoing (e.g., parallel threads), the first portion of the memory may not be able to be immediately freed. For example, a parallel read operation may be performed on the data structure to access the first portion of the memory. If the memory manager (responsible for freeing memory) is unaware of all of the ongoing threads in the database system, the memory manager cannot determine when the first portion of the memory can be freed.

Meanwhile, locking can be required to ensure only proper data is read on the data structure. In order to ensure data consistency, data structures can be locked using read/write locks that are exclusive for modification for the underlying data and are shared for reading operations. However, read/write locks are not particularly cheap synchronization primitives. Overhead of read/write locks may be created. In addition, problems with lock manager can be created when there are many reading operations, such as problems with synchronization. Thus, performance of multiple-core computing systems can be seriously limited.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing lock-free read access to data structures using garbage collection.

As described above, because other threads may be ongoing (e.g., parallel threads), the first portion of the memory may not be able to be immediately freed. If the memory manager (responsible for freeing memory) is unaware of all of the ongoing threads in the database system, the memory manager cannot determine when the first portion of the memory can be freed. Meanwhile, locking can be required to ensure only proper data is read on the data structure. However, performance bottlenecks and problems may be produced due to locking.

Therefore, a technological solution is needed to provide a lock-free read access to data structures. The technological solution in the present disclosure can provide a lock-free read access to data structures using garbage collection. The first portion of the memory cannot be freed immediately. Instead the first portion of the memory can be attached to a garbage collection system that ensures that the first portion of the memory is freed far enough in the future so that no parallel thread might still operate on the data.

Figure 1:
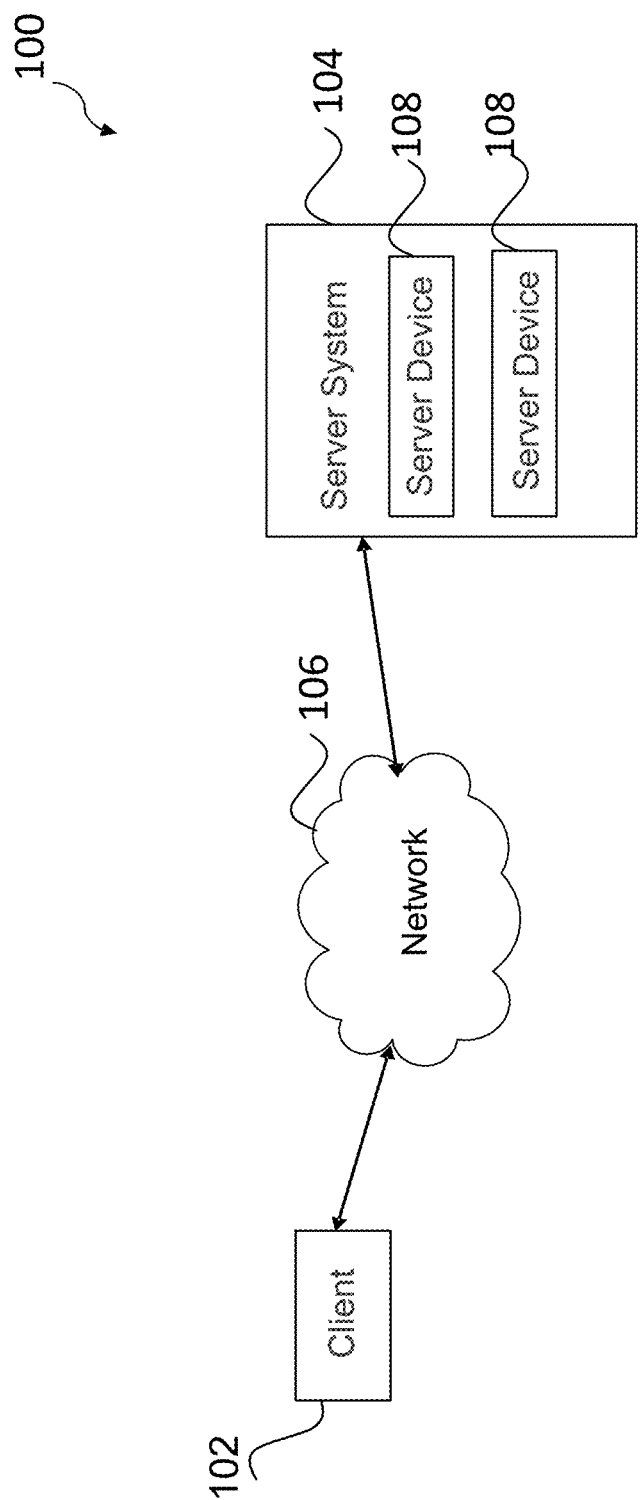
FIG. 1 illustrates an example system implementing mechanisms for providing lock-free read access to data structures using garbage collection, according to some embodiments of the disclosure.

FIG. 1 illustrates an example system 100 implementing mechanisms for providing lock-free read access to data structures using garbage collection, according to some embodiments of the disclosure. The example system 100 is provided for the purpose of illustration only and does not limit the disclosed embodiments.

The example system 100 includes, but is not limited to, a client device 102, a server system 104 and a network 106. The server system 104 includes one or more server devices 108. In one example, a user can interact with the client device 102. In an example context, the user can include a user who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a database system that stores data. In some examples, the database system can store data in one or more data structures. In some examples, the one or more data structures can include a vector and/or a hashmap. In some examples, the client device 102 can interact with the database system to access data stored therein. For example, the client device 102 can interact with the database system to read data from, delete data from, add data to, and/or modify data within one or more data structures. It is contemplated that other devices, such as server systems, can interact with the database system over the network 106.

An example database system can include an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

As introduced above, implementations of the present disclosure are directed to provide a lock-free read access to data structures using garbage collection. More particularly, implementations of the present disclosure are directed to maintaining pendency of a clean-up entry (that can be executed to free memory) until any parallel threads are executed.

Figure 2A:
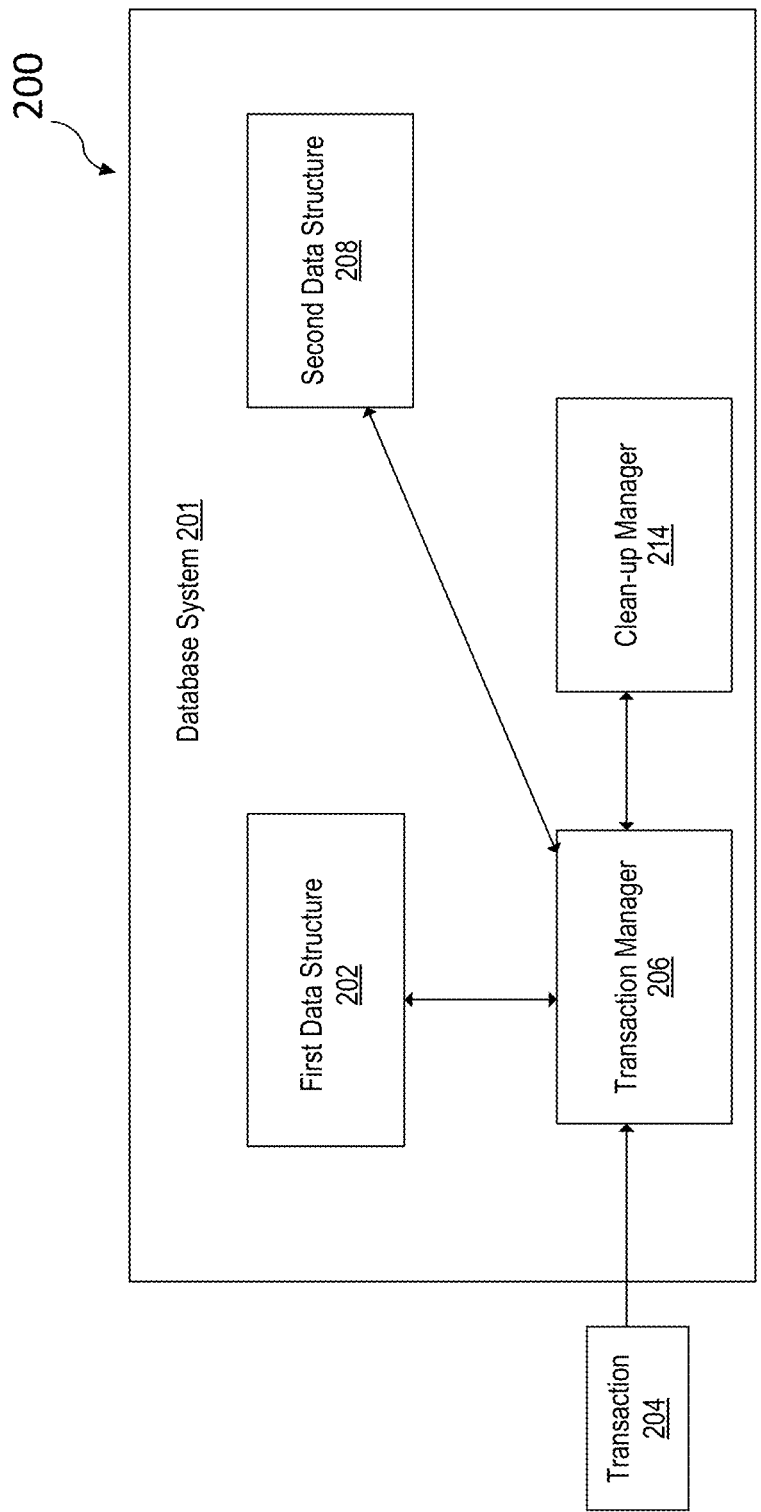
FIG. 2A depicts an example conceptual architecture in accordance with implementations of the present disclosure.

FIG. 2A depicts an example conceptual architecture 200 in accordance with implementations of the present disclosure. The example conceptual architecture is provided for the purpose of illustration only and does not limit the disclosed embodiments.

The conceptual architecture 200 includes a database system 201 that receives transaction data 204. In some examples, the transaction data 204 can indicate a transaction that is to be performed by the database system 201. In the depicted example, the database system 201 includes a first data structure 202 and a second data structure 208, a transaction manager 206 and a clean-up manager 214.

In some examples, each of the first data structure 202 and the second data structure 208 can include a hash map or a vector. In some examples, a hash map is a data structure that maps keys to values. A hash map can use a hash function to compute an index into an array of buckets or slots, from which the corresponding value can be found. In some examples, a hash map can be internally divided into buckets. Each bucket can store data for a certain range of hash values. A hash map can use storage locations for the buckets.

In some examples, a vector can include a sequence container to store a list of elements and not index based. Vector can be dynamic and a size of the vector can increase with insertion of elements. A vector can use contiguous storage locations for the elements. The elements can also be accessed using offsets on pointers to the elements.

In some examples, the transaction manager 206 can be informed of transactions that are to be performed in the database system 201. For example, the transaction data 204 can indicate a transaction associated with first data structure 202 and/or second data structure 208, and the transaction manager 206 can be informed of execution of the transaction on first data structure 202 and/or second data structure 208. Example transactions can include reading data from, writing data to, deleting data from, and modifying data within first data structure 202 and/or second data structure 208.

In some examples, the transaction manager 206 can coordinate transactions that are to be performed in the database system 201. Example transactions can include a first transaction, such as reading data from, writing data to, deleting data from, and modifying data within first data structure 202. Example transactions can include a second transaction, such as reading data from, writing data to, deleting data from, and modifying data within second data structure 208. In some examples, the transaction data 204 can indicate the first transaction associated with first data structure 202 and the second transaction associated with second data structure 208. The transaction manager 206 can coordinate an order to perform the first transaction or the second transaction. For example, the transaction manager 206 can determine that the first transaction can be executed prior to an execution of the second transaction. Alternatively or in addition, the transaction manager 206 can determine that the first transaction can be executed subsequent to an execution of the second transaction. In some examples, a database abstraction layer (e.g., a SQL layer) (not shown in FIG. 2) coordinates communication between an application (e.g., executing on an application server), and the database system 201. In some examples, the database abstraction layer analyzes an incoming statement (e.g., insert, update, delete, select), and forwards it to the first data structure 202 and/or second data structure 208. When forwarding transactions, the transaction manager 206 is involved in assigning, for example, a transaction identifier, timestamps, and the like.

In some examples, when a transaction is completed, the transaction is assigned a commit timestamp (commitTS) upon completion (committal) of the transaction, and a read timestamp (readTS) when the transaction starts. In some examples, the readTS is equal to the highest previously assigned commitTS. Logically, this means that a transaction may see all operations, which have been committed before the transaction starts. A minimum readTS (minReadTS) is also provided, and is the lowest readTS of all running transactions (parallel transactions) in the system. The transaction manager 206 can be continuously aware of the minReadTS.

In some examples, every data object in the database is assigned a commitTS, which is equal to the commitTS of the transaction that created the object. For example, when an element is inserted to the first data structure 202, the first data structure 202 can be assigned the commitTS of the transaction that was executed to insert the element, upon completion of the transaction (e.g., after the transaction commits).

Figure 2B:
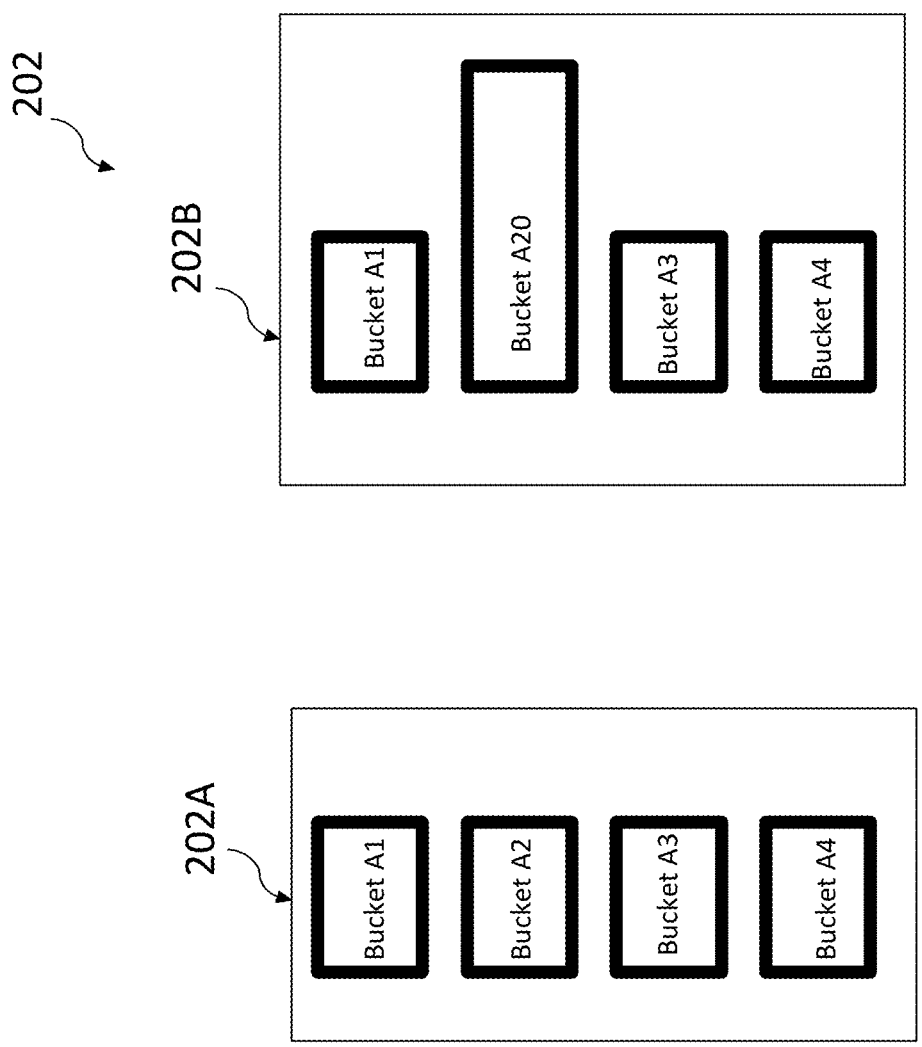
FIG. 2B illustrates a block diagram of an example data structure, according to some embodiments.

FIG. 2B illustrates a block diagram of an example data structure, according to some embodiments. The example data structure is provided for the purpose of illustration only and does not limit the disclosed embodiments. FIG. 2B may be described with regard to elements of FIGS. 1 and 2A.

As shown in FIG. 2B, first data structure 202 includes a first data structure 202A and a first data structure 202B. The first data structure 202A includes a hash map internally divided into buckets A1, A2, A3 and A4. The first data structure 202B includes a hash map internally divided into buckets A1, A20, A3 and A4.

As described above, a hash map can use storage locations for the buckets. In some examples, first data structure 202A can use main memory for data storage, as described with reference to FIG. 1. For example, a first portion of a memory for data storage, such as associated with server system 104, may be allocated for bucket A2 in the first data structure 202A.

In some examples, when inserting data into first data structure 202A in a write transaction or a thread to write, a size of a bucket (e.g., bucket A2) can increase with insertion of data, such as values. Bucket A2 can be enlarged and be modified to bucket A20. First data structure 202A can be modified to first data structure 202B. When inserting data into bucket A2, the first portion of the memory may be checked based on a capacity. When the first portion of the memory may be determined to be full, a second portion of the memory, such as different from the first portion of the memory may need to be allocated when bucket A2 is enlarged.

Data in bucket A2 or the first portion of the memory may be duplicated and transferred to bucket A20 or the second portion of the memory. Subsequently, new data can be inserted to bucket A20 or the second portion of the memory. The first portion of the memory may be freed or data in the first portion of the memory may be deleted. If there may be parallel transactions or threads accessing the data meanwhile, the first portion of the memory may be not freed immediately. Instead the first portion of the memory can be attached to a garbage collection system that ensures that the first portion of the memory is freed far enough in the future so that no parallel transaction or thread might still operate on the data. Garbage collection can be described as automatic memory management, in which a computer-implemented memory manager (also referred to as a garbage collector), such as the clean-up manager 214, reclaims memory occupied by data that is no longer in use by a system, such as the database system 201.

In some examples, another transaction or thread (e.g., a read transaction or a thread to read) may be executing in parallel to the write transaction or the thread to write, and may require access to the data in bucket A2 or the first portion of the memory. Consequently, the clean-up manager cannot delete the data in bucket A2 or the first portion of the memory upon completion of the write transaction, and must wait until a future point in time (e.g., when any and all parallel transactions needing access to the data have completed).

As will be described with reference to FIG. 3A, a clean-up entry may be logged in the transaction manager, and remain pending until a subsequent point in time. In some implementations, the clean-up entry is assigned a time that is based on a commitTS of a parallel transaction that is committed, in particular, the last parallel transaction. The time is compared to the most recently reported minReadTS. If the time is less than the most recently reported minReadTS, the clean-up entry is executed (e.g., by the memory manager). If the time is not less than the most recently reported minReadTS, the clean-up entry is attached to a next subsequent transaction. When a subsequent transaction that the clean-up entry is attached to commits, the time is again compared to the then most recently reported minReadTS, and the process continues until the clean-up entry is able to be executed.

As will be described with reference to FIG. 3B, the clean-up of a clean-up entry can be triggered is when there is no other thread with readTS equal to the time assigned to the clean-up entry. In order to execute a clean-up entry, the time assigned to the clean-up entry can be compared with readTS of other threads.

In some examples, when performing a read operation on the first data structure 202A, an iterator may read from all the buckets by using iteration of all the entries. The iterator may read from all the buckets multiple times during the iteration. When the bucket A2 of the first data structure 202A is enlarged during the read operation, the iterator may inadvertently access one or more portions of bucket A20.

Figure 2C:
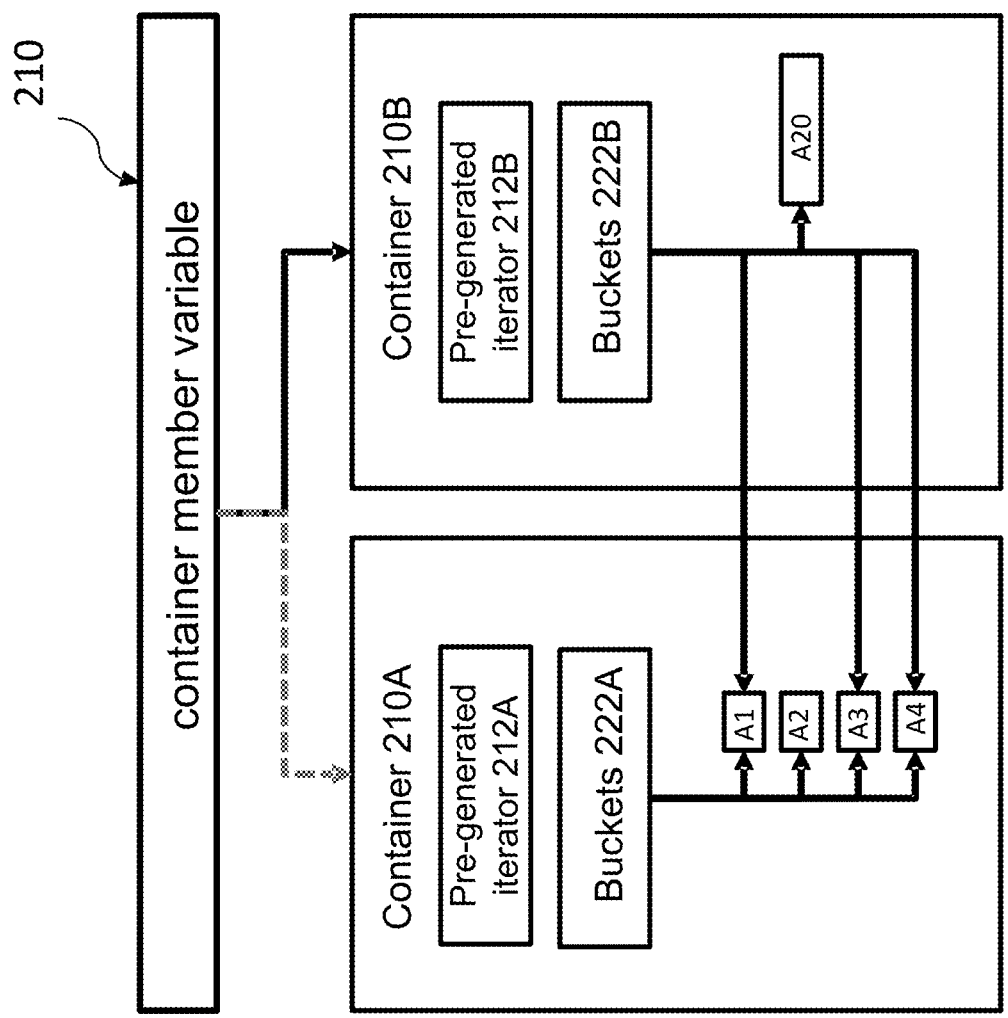
FIG. 2C illustrates a block diagram of an example container structure, according to some embodiments.

FIG. 2C illustrates a block diagram of an example container structure, according to some embodiments. The example data structure is provided for the purpose of illustration only and does not limit the disclosed embodiments. FIG. 2C may be described with regard to elements of FIGS. 1, 2A and 2B.

As shown in FIG. 2C, container member variable 210 may point to container 210A and container 210B. Container 210A includes pre-generated iterator 212A and buckets 222A. Buckets 222A includes buckets A1, A2, A3 and A4. Container 210B includes pre-generated iterator 212B and buckets 222B. Buckets 222B includes buckets A1, A20, A3 and A4.

As described above, the first data structure 202A can include a hash map internally divided into buckets A1, A2, A3 and A4. The first data structure 202B can include a hash map internally divided into buckets A1, A20, A3 and A4. In some examples, when performing a read operation on the first data structure 202A, an iterator may read from all the buckets by using iteration of all the entries. The iterator may read from all the buckets multiple times during the iteration. When the bucket A2 of the first data structure 202A is enlarged during a read operation, the iterator may inadvertently access one or more portions of buckets A2 and A20.

To avoid the inadvertent access during the read operation, when the bucket A2 of the first data structure 202A is enlarged, container 210B can be generated. Container 210B can be inserted in the first data structure 202B. Pre-generated iterator 212B can be generated in advance when container 210B is being built. Pre-generated iterator 212B can be generated to use a proper set of buckets (e.g., A1, A20, A3 and A4) or container 210B during a read operation. Container 210A can be inserted in the first data structure 202A. Pre-generated iterator 212A can be generated in advance when container 210A is being built. Pre-generated iterator 212A can be generated to use a proper set of buckets (e.g., A1, A2, A3 and A4) or container 210A during a read operation. During a read operation, when the bucket A2 of the first data structure 202A is enlarged, one of the container 210B and the container 210A can be selected to read a proper set of buckets. For example, the container 210A can be atomically switched to the container 210B to read from buckets A1, A20, A3 and A4 by changing the container member variable 210.

Figure 2D:
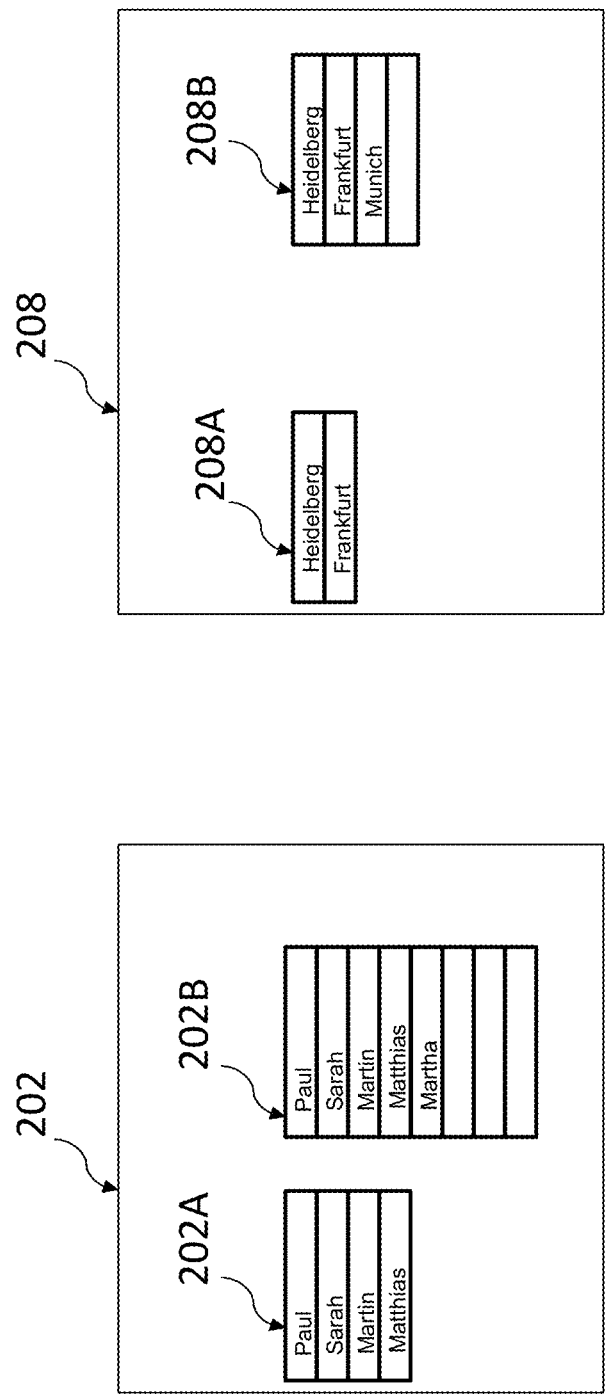
FIG. 2D illustrates a block diagram of two example data structures, according to some embodiments.

FIG. 2D illustrates a block diagram of two example data structures, according to some embodiments. The example data structures are provided for the purpose of illustration only and does not limit the disclosed embodiments. FIG. 2D may be described with regard to elements of FIGS. 1 and 2A.

As shown in FIG. 2D, first data structure 202 includes a first data structure 202A and a first data structure 202B. Second data structure 208 includes a second data structure 208A and a second data structure 208B. First data structure 202A includes a first hash map with four buckets. Second data structure 208A includes a second hash map with two buckets.

In some examples, the second data structure 208 can be associated with the first data structure 202 based on contextual information. For example, the first data structure 202A can include customer information, such as names of customers, in the database system 201. The second data structure 208A can include customer information, such as locations corresponding to the customers associated with the first data structure 202A, in the database system 201. The contextual information can indicate an order for performing a first read operation on the first data structure 202 and a second read operation on the second data structure 208. In some examples, the contextual information can indicate an order for performing a first read operation on the first data structure 202 prior to a second read operation on the second data structure 208. For example, the contextual information can indicate an order for performing the first read operation to read a name of a customer in the first data structure 202 prior to the second read operation to read a corresponding location of the customer in the second data structure 208.

As described above, when inserting data into the first data structure 202A in a first write transaction or a first thread to write, a size of the first hash map can increase with insertion of data. For example, one of the buckets in the first data structure 202A can be enlarged in size and be modified to first data structure 202B. When inserting data into the first data structure 202A, the first portion of the memory may be checked based on a capacity. When the first portion of the memory may be determined to be full, a second portion of the memory, such as different from the first portion of the memory may need to be allocated when one of the buckets in the first data structure 202A is enlarged in size. The first portion of the memory may be not freed immediately. Instead the first portion of the memory can be attached to a garbage collection system that ensures that the first portion of the memory is freed far enough in the future so that no parallel transaction or thread might still operate on the data. As shown in FIG. 2C, when inserting "Martha" into the first data structure 202A, the first data structure 202A can be modified to first data structure 202B. Similarly, when inserting data into the second data structure 208A in a second write transaction or a second thread to write, a size of the second hash map can increase with insertion of data. For example, one of the buckets in the second data structure 208A can grow in size and be modified to the second data structure 208B. When inserting data into the second data structure 208A, the second portion of the memory may be checked based on a capacity. When the second portion of the memory may be determined to be full, a fourth portion of the memory, such as different from the second portion of the memory may need to be allocated when one of the buckets in the second data structure 208A is enlarged in size. The second portion of the memory may be not freed immediately. Instead the second portion of the memory can be attached to a garbage collection system that ensures that the second portion of the memory is freed far enough in the future so that no parallel transaction or thread might still operate on the data. As shown in FIG. 2C, when inserting "Munich" into the second data structure 208A, the second data structure 208A can be modified to second data structure 208B.

In some examples, subsequent to receiving a request to insert "Martha" into the first data structure 202A, whether the inserting "Munich" into the second data structure 208A is to be executed prior to inserting "Martha" into the first data structure 202A can be determined, based on the contextual information. For example, "Munich" may be associated with a location of "Martha". The inserting "Munich" into the second data structure 208A can be determined to be executed prior to inserting "Martha" into the first data structure 202A. As described above, the contextual information can indicate an order for performing the first read operation to read a name of a customer in the first data structure 202A prior to the second read operation to read a corresponding location of the customer in the second data structure 208A. In some examples, an order of the inserting "Munich" into the second data structure 208A and the inserting "Martha" into the first data structure 202A can be determined to be in reverse of the order for performing the first read operation to read a name of a customer (e.g., "Martha") in the first data structure 202A prior to the second read operation to read a corresponding location of the customer ("Munich") in the second data structure 208A. In another example, header information of an order is read before line item information is read. In this case, line item information needs to get written first, and then the header information. This way it is guaranteed that no parallel threads reads a header for which no line items exist yet. Based on the determination to the inserting "Munich" into second data structure 208A is to be executed prior to inserting "Martha" into first data structure 202A, "Munich" can be inserted into the second data structure 208A. The second data structure 208A can grow in size and be modified to the second data structure 208B. Subsequently, "Martha" can be inserted into the first data structure 202A. The first data structure 202A can grow in size and be modified to the first data structure 202B.

In some examples, although the first data structure 202A, 202B and/or the second data structure 208A, 208B are depicted and described as hash maps, the first data structure 202A, 202B and/or the second data structure 208A, 208B can include one or more vectors or hash maps.

Figure 3A:
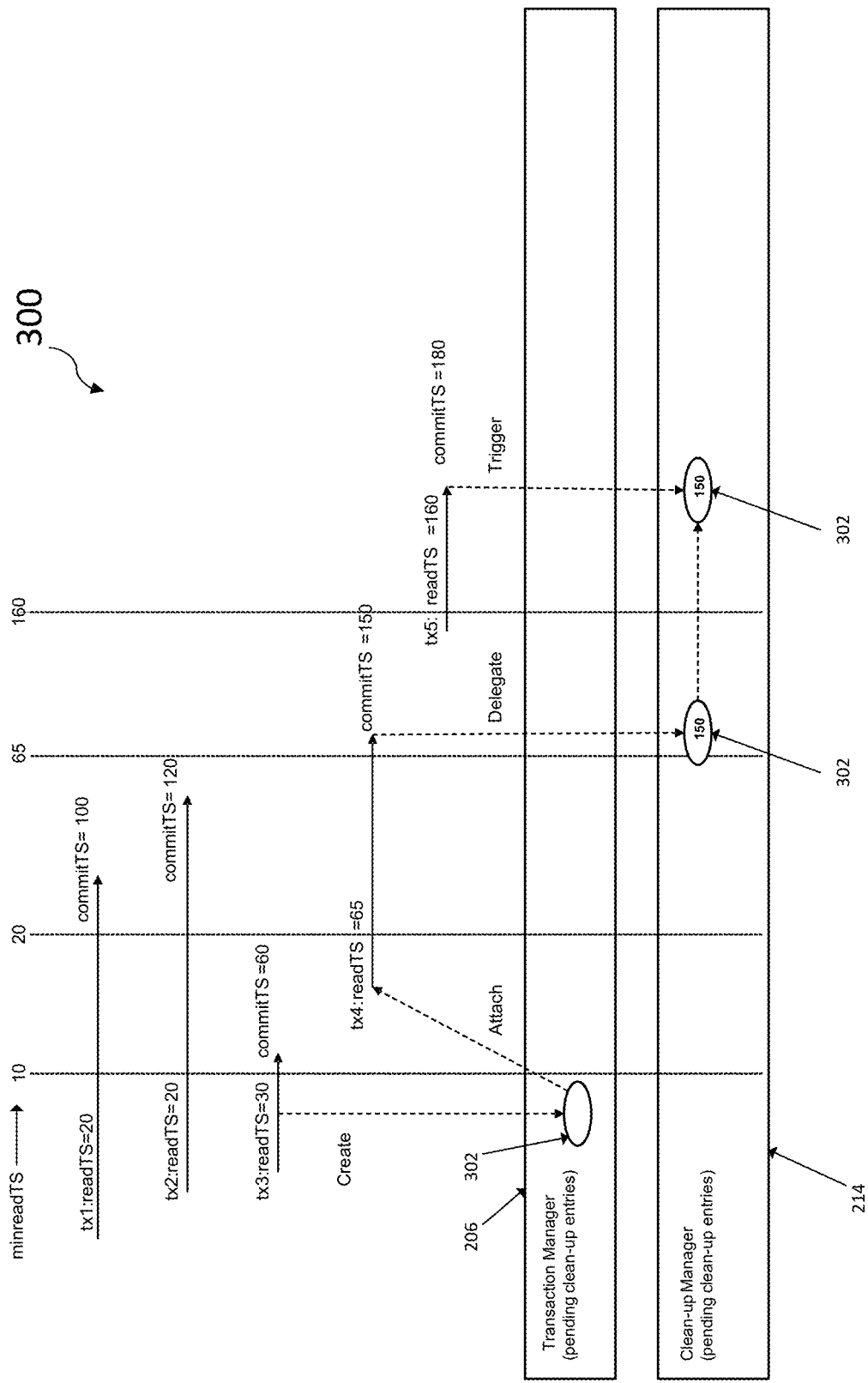
FIG. 3A depicts an example transaction timeline in accordance with implementations of the present disclosure.

FIG. 3A depicts an example transaction timeline 300 in accordance with implementations of the present disclosure. The example transaction timeline 300 is provided for the purpose of illustration only and does not limit the disclosed embodiments. FIG. 3A may be described with regard to elements of FIGS. 1 and 2A-2C.

A database transaction can be a sequence of Structured query language (SQL) statements that the database system treats as a unit. A transaction can bring the database from one consistent state to another. If a transaction is interrupted, then the database system returns the database to the state it was in before the transaction began.

The example transaction timeline 300 includes a first transaction (tx1), a second transaction (tx2), a third transaction (tx3), a fourth transaction (tx4), and a fifth transaction (tx5). In the depicted example, the third transaction begins and ends while the first transaction and the second transaction are being performed (e.g., before either the first transaction or the second transaction are committed). The fourth transaction begins after the third transaction is committed, and ends after both the first transaction and the second transaction are committed. The fifth transaction begins after the fourth transaction is committed.

In the example of FIG. 3A, the vertical lines with numerical markers (e.g., 10, 20, 65, 160) indicate instances where the transaction manager 206 has been informed. In some examples, the respective numerical values are the min-ReadTS values reported by the transaction manager 206.

For purposes of illustration, the first transaction can be provided as a data insertion, which is assigned a readTS equal to 20. Consequently, the insertion can be stored to memory (e.g., in a slice memory block). The second transaction can be provided as a data selection (e.g., selecting all available data). Consequently, the selection may read all data that was committed before or with commitID=20 as this is the readTS for that transaction. It cannot yet read the data that is being inserted by the parallel transaction (the first transaction).

The third transaction can be provided as a data insertion, which is assigned a readTS equal to 30. Consequently, the data insertion can be stored to memory. The third transaction is committed, and is assigned a commitTS equal to 60. For example, the third transaction can include a data insertion to the first data structure 202A. As described above, For example, the first data structure 202A can grow in size and be modified to the first data structure 202B. The first portion of the memory may need to be freed or data in the first portion of the memory may need to be deleted. The first portion of the memory can be attached to a garbage collection system that ensures that the first portion of the memory is freed far enough in the future so that no parallel transaction might still operate on the data.

Thus, a clean-up entry 302 can be entered to the transaction manager 206, but does not yet have an indication as to when the clean-up entry 302 is to be performed by the clean-up manager 214. In accordance with implementations of the present disclosure, and as described in further detail herein, the clean-up entry 302 can remain pending without a time indicator, irrespective of any ongoing or parallel transactions. The reason is that a point in time which is sufficiently far in the future when the clean-up entry 302 may be executed is unknown, due to the possible existence of unaware transactions. As described in further detail herein, implementations of the present disclosure enable such a point in time to be determined by taking another transaction that starts in the future (per transaction, their readTS are always known) and using its commitTS instead of the own commitTS.

Continuing with the example of FIG. 3A, the fourth transaction begins and is assigned a readTS equal to 65. The clean-up entry 302 is attached to the fourth transaction, as it is a newly started transaction. In accordance with the present disclosure, the fourth transaction is used to eventually determine a commitTS that is sufficiently far in the future, as mentioned as a pre-requisite before. In the example of FIG. 3A, at some point after the fourth transaction begins, the current minReadTS is equal to 20. This means that there is at least one non-committed transaction in the system having a readTS equal to 20.

Continuing with the example of FIG. 3A, the first transaction is committed and is assigned a commitTS equal to 100, and the second transaction is committed, and is assigned a commitTS equal to 120. Accordingly, the third transaction occurred and was committed, while the first transaction and the second transaction were executed in parallel. However, the clean-up entry 302 corresponding to the third transaction still remains pending, as the fourth transaction has not yet committed. Continuing with the example of FIG. 3A, at some point after the fourth transaction begins, the then-current minReadTS is equal to 65. This means that there is at least one non-committed transaction in the system having a readTS equal to 65. Thereafter, fourth transaction is committed and is assigned a commitTS equal to 150.

The clean-up entry 302 is assigned a time equal to the commitTS of the fourth transaction. This is independent from any other transactions running in parallel in the system. Even if the first or second transactions were still running, commitTS could be used as a time indicator. This is because clean-up is only executed based on the provided minReadTS, and the minReadTS would not be increased by the transaction manager 206, if there were still transactions running. In the example of FIG. 3A, the clean-up entry 302 is assigned the time 150 (i.e., the commitTS of the fourth transaction), and is delegated to the clean-up manager 214. The clean-up entry 302, however, is not performed until the minReadTS reported to the transaction manager 206 exceeds the time assigned to the clean-up entry, and a next subsequent transaction is committed.

In the example of FIG. 3A, the fifth transaction is the next subsequent transaction. When a transaction starts, it checks the clean-up manager 214 for pending clean-up entries. If any exist—in this example clean-up entry 302 does exist—it is attached to the transaction. If, however, the next subsequent transaction is never committed, the clean-up entry is moved back to await attachment to another next subsequent transaction. In some examples, a transaction never commits, if the transaction is aborted. For example, if the fifth transaction is aborted, the clean-up entry 302 is moved back, and is attached to the next subsequent transaction (e.g., a sixth transaction, not depicted). The example of FIG. 3A, however, depicts a scenario, in which the fifth transaction is committed (e.g., is not aborted).

Continuing with the example of FIG. 3A, at some point after the fifth transaction begins, the then-current minReadTS is equal to 160. This means that there is at least one non-committed transaction in the system having a readTS equal to 160.

The fifth transaction is committed and is assigned a commitTS equal to 180. Because the clean-up entry 302 is attached to the fifth transaction, committal of the fifth transaction triggers a check between the time assigned to the clean-up entry 302 (e.g., 150), and the last minReadTS reported to the transaction manager 206 (e.g., 160). If the time assigned to the clean-up entry 302 is less than the last minReadTS reported to the transaction manager 206, the clean-up entry 302 is executed by the clean-up manager 214 to remove the corresponding data from the first portion of the memory or to free-up the first portion of the memory. If the time assigned to the clean-up entry 302 is not less than the last minReadTS reported to the transaction manager 206, the clean-up entry 302 is moved back, and is attached to the next subsequent transaction. In the example of FIG. 3, the time is less than the last-reported minReadTS, and the clean-up entry 302 is executed.

In some implementations, in order to execute a clean-up entry, the clean-up entry has to be attached to a transaction, and the only point in time when the clean-up of a clean-up entry is triggered is when that transaction commits. The pre-requisite is that the time of the clean-up entry is lower than the then-current minReadTS in the system. If this pre-requisite is not given or the transaction never commits, the clean-up entry is moved back to the clean-up manager where it awaits attachment to a subsequent transaction. In this manner, the clean-up does not occur at the earliest point in time when there are no transactions anymore that may see the data. In fact, the clean-up may be delayed significantly based on the workload in the system. As the amounts of data that are to be freed per clean-up entry are usually small, this delay is deemed acceptable, and normal for a garbage-collection system.

Figure 3B:
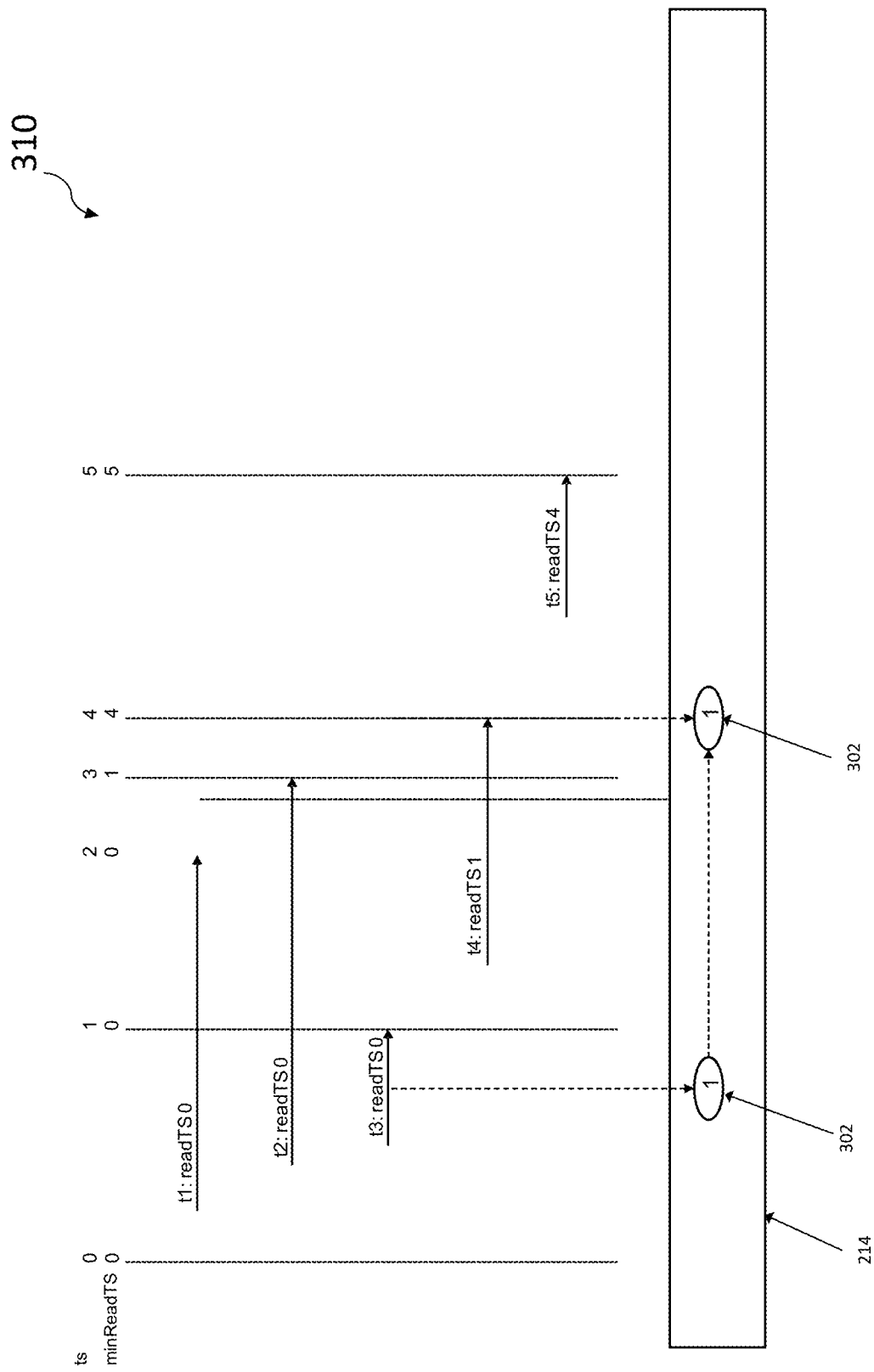
FIG. 3B depicts an example timeline in accordance with implementations of the present disclosure.

FIG. 3B depicts an example timeline 310 in accordance with implementations of the present disclosure. The example timeline 310 is provided for the purpose of illustration only and does not limit the disclosed embodiments. It describes a cleanup mechanism for systems without a transaction manager. FIG. 3B may be described with regard to elements of FIGS. 1 and 2A.

The example timeline 310 includes a first thread (t1), a second thread (t2), a third thread (t3), a fourth thread (t4), and a fifth thread (t5). In the depicted example, the third thread begins and ends while the first thread and the second thread are being executed (e.g., before either the first thread or the second thread are executed). The fourth thread begins after the third thread is committed, and ends after both the first thread and the second thread are committed. The fifth thread begins after the fourth thread is committed.

In some examples, the threads in example timeline 310 may not be transaction based. A linked list of running threads may be maintained based on the beginning and the completion of the each thread. In some examples, a non-blocking linked list is an example of non-blocking data structures designed to implement a linked list in shared memory using synchronization primitives.

In the example of FIG. 3B, the vertical lines with numerical markers (e.g., 0, 1, 2, 3, 4, 5) indicate a time stamp (TS). In some examples, a read timestamp (readTS) can be assigned when each thread starts. The vertical lines with numerical markers (e.g., 0, 0, 0, 1, 4, 5) indicate the corresponding minReadTS values. A minimum readTS (minReadTS) can be the lowest readTS of all running threads (parallel threads) in the system.

For purposes of illustration, the first thread can be provided as a data insertion, which is assigned a readTS equal to 0. Consequently, the insertion can be stored to memory (e.g., in a slice memory block). The second thread can be provided as a data selection (e.g., selecting all available data). Consequently, the selection may read all data that was committed before readTS for that thread. It cannot yet read the data that is being inserted by the parallel thread (the first thread).

The third thread can be provided as a data insertion, which is assigned a readTS equal to 0. Consequently, the data insertion can be stored to memory. The third thread is executed, and completed at TS=1. For example, the third thread can include a data insertion to write data to the first data structure 202A. As described above, the first data structure 202A can grow in size and be modified to the first data structure 202B. The first portion of the memory may need to be freed or data in the first portion of the memory may need to be deleted. The first portion of the memory can be attached to a garbage collection system that ensures that the first portion of the memory is freed far enough in the future so that no parallel thread might still operate on the data.

Thus, a clean-up entry 302 can be entered to the clean-up manager 214, but does not yet have an indication as to when the clean-up entry 302 is to be performed by the clean-up manager 214. In accordance with implementations of the present disclosure, and as described in further detail herein, the clean-up entry 302 remains pending without a time indicator, irrespective of any ongoing or parallel threads. The reason is that a point in time which is sufficiently far in the future when the clean-up entry 302 may be executed is unknown, due to the possible existence of unaware threads. As described in further detail herein, implementations of the present disclosure enable such a point in time to be determined by taking another thread that starts in the future. The clean-up entry 302 is assigned a time equal to the current minReadTS+1, such as equal to 1 in FIG. 3B.

Continuing with the example of FIG. 3B the fourth thread begins and is assigned a readTS equal to 1. Time of the clean-up entry 302 is compared with the readTS of the first thread, second thread and fourth thread. The clean-up entry 302, however, is not performed until there is no other thread with readTS equal to the time assigned to the clean-up entry 302. The fourth thread is executed, and completed at TS=4. The clean-up entry 302, however, is performed upon the completion of the execution of the fourth thread, since there is no other thread with readTS equal to the time assigned to the clean-up entry 302. The clean-up entry 302 is executed by the clean-up manager 214 to remove the corresponding data from the first portion of the memory or to free-up the first portion of the memory. In the example of FIG. 3B, the fifth transaction is the next subsequent transaction and is assigned a readTS equal to 4.

In some implementations, in order to execute a clean-up entry, the time assigned to the clean-up entry can be compared with readTS of other threads. The clean-up of a clean-up entry can be triggered is when there is no other threads with readTS equal to the time assigned to the clean-up entry 302.

Figure 4:
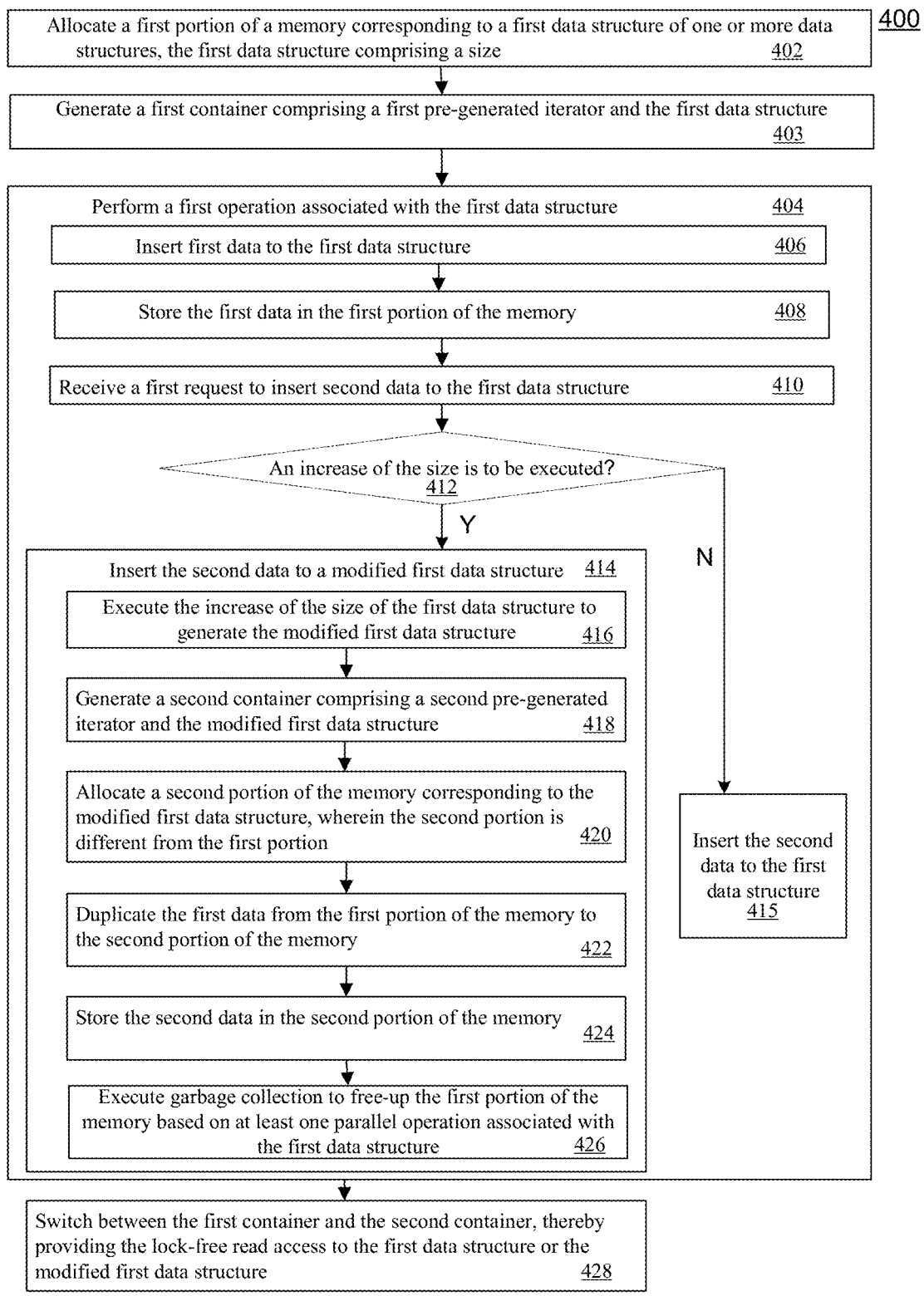
FIG. 4 illustrates an example method for providing lock-free read access to data structures using garbage collection, according to some embodiments.

FIG. 4 illustrates an example method for providing lock-free read access to data structures using garbage collection, according to some embodiments. As a convenience and not a limitation, FIG. 4 may be described with regard to elements of FIGS. 1, 2A-2D and 3A-3B. Method 400 may represent the operation of a computing system (e.g., the database system 201 of FIG. 2A) for providing lock-free read access to data structures using garbage collection. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

In step 402, the database system 201 allocates a first portion of a memory corresponding to a first data structure (e.g., bucket A2 in first data structure 202A) of one or more data structures. The first data structure (e.g., bucket A2) can comprise a size. The memory can include a memory associated with the server system 104. As described above, bucket A2 in the first data structure 202A can use main memory for data storage, as described with reference to FIG. 1.

In step 403, the database system 201 generates a first container comprising a first pre-generated iterator and the first data structure. As describe above with reference to FIG. 2C, container 210A includes pre-generated iterator 212A and buckets 222A. Buckets 222A includes buckets A1, A2, A3 and A4.

In step 404, the database system 201 performs a first operation associated with the first data structure. In some examples, the first operation can include a transaction or a thread.

Particularly, in step 406, the database system 201 inserts first data to the first data structure. In step 408, the database system 201 stores the first data in the first portion of the memory. In step 410, the database system 201 receives a first request to insert second data to the first data structure. In step 412, in response to the receiving the first request, the database system 201 determines whether an increase of the size is to be executed. As described above, when inserting data into bucket A2 in the first data structure 202A, the first portion of the memory may be checked based on a capacity. When the first portion of the memory may be determined to be full, a second portion of the memory, such as different from the first portion of the memory may need to be allocated when the size of bucket A2 is increased.

If no increase of the size to be executed is determined, the method 400 goes to 415. In step 415, the database system 201 inserts the second data to the first data structure.

If an increase of the size to be executed, the method 400 goes to 414. In step 414, the database system 201 inserts the second data to a modified first data structure.

Particularly, in step 416, the database system 201 executes the increase of the size of the first data structure to generate the modified first data structure. As described above, first data structure 202A can be modified to first data structure 202B.

In step 418, the database system 201 allocates a second portion of the memory corresponding to the modified first data structure. The second portion the memory can be different from the first portion of the memory.

In step 420, the database system 201 generates a second container comprising a second pre-generated iterator and the modified first data structure. As described above in FIG. 2C, container 210B includes pre-generated iterator 212B and buckets 222B. Buckets 222B includes buckets A1, A20, A3 and A4.

In step 422, the database system 201 duplicates the first data from the first portion of the memory to the second portion of the memory.

In step 424, the database system 201 stores the second data in the second portion of the memory.

In step 426, the database system 201 executes garbage collection to free-up the first portion of the memory based on at least one parallel operation associated with the first data structure. As described above in FIG. 2A, the database system 201 can include a transaction manager and a clean-up manager. In some examples, the database system 201 can determine a delete operation associated with the first portion of the memory. As described above in FIG. 3A, in response to the delete operation, the database system 201 can insert a clean-up entry in the transaction manager. The transaction manager can delegate the clean-up entry to the clean-up manager. In some examples, the transaction manager can attach the clean-up entry to a subsequent transaction in order to determine and to assign a time to the clean-up entry that is used to subsequently trigger garbage collection. The time assigned to the clean-up entry can be associated with the at least one parallel operation. In some examples, the database system 201 can compare the time to a most-recent minimum read timestamp. The minimum read timestamps can be associated with start times of a plurality of transactions. The pendency of the clean-up entry can be maintained until the at least one parallel transaction is executed. In some examples, the database system 201 can determine whether the time is less than the most-recent minimum read timestamp. In some examples, the database system 201, in response to determining whether the time is less than the most-recent minimum read timestamp, can generate a trigger to execute the clean-up entry to free-up the first portion of the memory.

In some examples, the transaction manager can attach the clean-up entry to a next subsequent transaction in response to determining that the time is not less than the most-recent minimum read timestamp.

In some examples, the most-recent minimum read timestamp can be a lowest read timestamp of all executing transactions in the database system.

In some examples, the time assigned to the clean-up entry can be equal to a commit timestamp of a last-committed parallel transaction.

Alternately or in addition, as described above in FIG. 3B, the first operation may not be transaction based. As described above, in order to execute a clean-up entry, the time assigned to the clean-up entry can be compared with readTS of other threads. The clean-up of a clean-up entry can be triggered is when there is no other threads with readTS equal to the time assigned to the clean-up entry.

In step 428, the database system 201 switches between the first container and the second container, thereby providing the lock-free read access to the first data structure or the modified first data structure. As described above in FIG. 2C, during a read operation, when the bucket A2 of the first data structure 202A is enlarged, one of the container 210B and the container 210A can be selected to read a proper set of buckets. For example, the container 210A can be atomically switched to the container 210B to read from buckets A1, A20, A3 and A4.

In some examples, as described with reference to FIG. 2D, the database system 201 can perform a second operation associated with a second data structure (e.g., second data structure 208A). The second data structure can be associated with the first data structure based on contextual information. In some examples, the database system 201 can receive a second request to insert third data to the second data structure. In some examples, the database system 201 can determine, based on the contextual information, whether the inserting the second data to the first data structure is to be executed subsequent to inserting the third data to the second data structure. In some examples, the database system 201, based on the determination that the inserting the second data to the first data structure is to be executed subsequent to inserting the third data to the second data structure, inserting the third data to the second data structure prior to the inserting the second data to the first data structure, thereby providing the lock-free read access to the first data structure or the second data structure.

Figure 5:
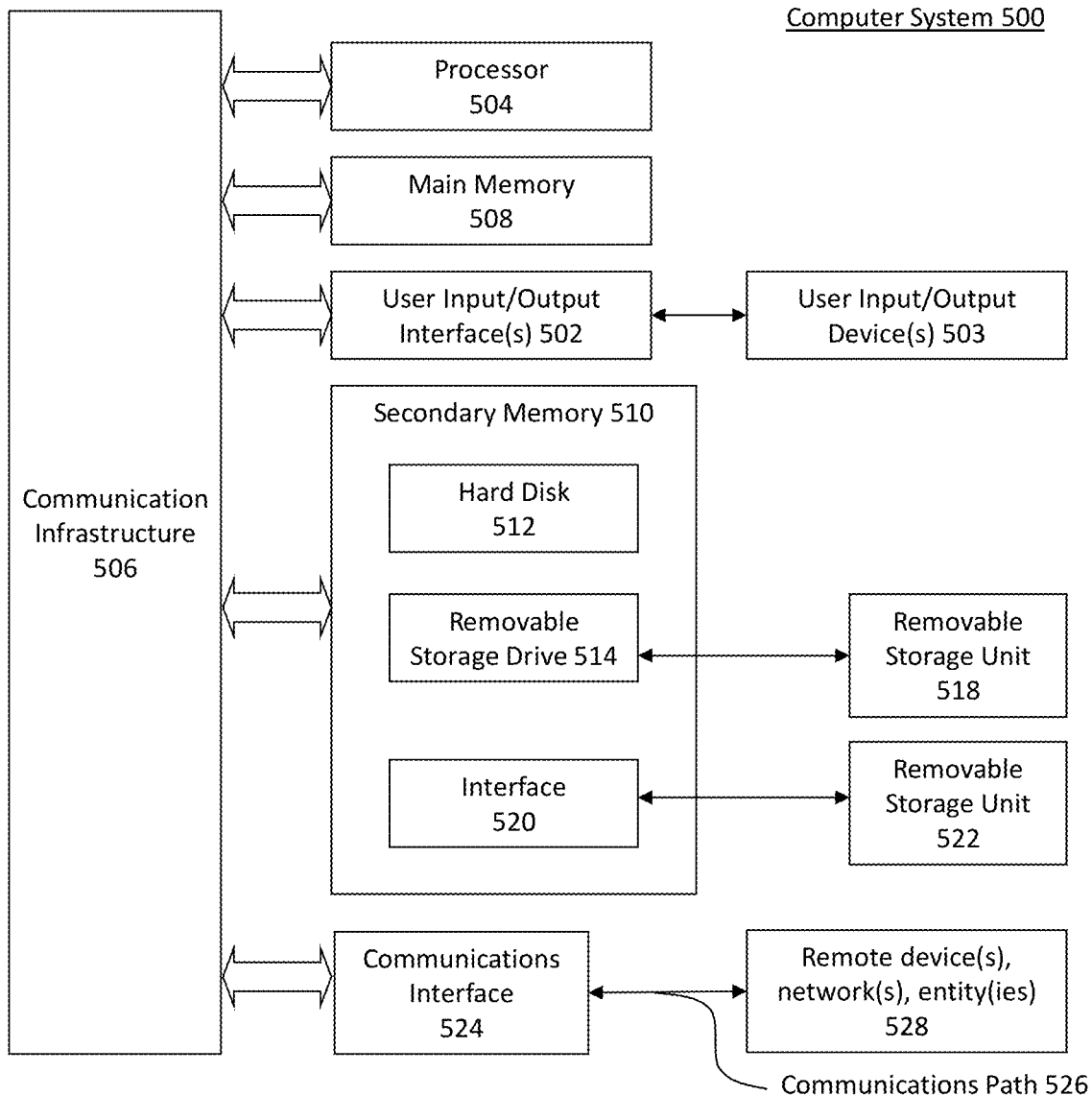
FIG. 5 illustrates an example computer system that can be used for implementing various embodiments.

Various embodiments may be implemented, for example, using one or more well-known computer systems, such as computer system 500 shown in FIG. 5. For example, database system 201 may be implemented using combinations or sub-combinations of computer system 500. Also or alternatively, client device 102, server system 104 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing a lock-free read access to one or more data structures in a database system, the computer-implemented method comprising:
    allocating a first portion of a memory corresponding to a first data structure of the one or more data structures;
    generating a first container comprising a first pre-generated iterator and the first data structure;
    determining that an increase of a size of the first data structure is needed;
    generating a modified first data structure based on the determining;
    generating a second container comprising a second pre-generated iterator and the modified first data structure;
    allocating a second portion of the memory corresponding to the modified first data structure, wherein the second portion of the memory is different from the first portion of the memory;
    duplicating first data from the first portion of the memory to the second portion of the memory;
    executing garbage collection to free-up the first portion of the memory based on at least one parallel operation associated with the first data structure; and
    switching between the first container and the second container, thereby providing the lock-free read access to the first data structure or the modified first data structure.

2. The computer-implemented method of claim 1, wherein the database system comprises a transaction manager and a clean-up manager.

3. The computer-implemented method of claim 2, wherein the executing garbage collection to free-up the first portion of the memory based on the at least one parallel operation comprises:
    determining a delete operation associated with the first portion of the memory;
    in response to the delete operation, inserting a clean-up entry in the transaction manager, the transaction manager delegating the clean-up entry to the clean-up manager;
    attaching the clean-up entry to a subsequent transaction in order to determine and to assign a time to the clean-up entry that is used to subsequently trigger garbage collection, wherein the time is associated with the at least one parallel operation, and a pendency of the clean-up entry is maintained until the at least one parallel operation is executed;
    determining whether the time is less than a most-recent minimum read timestamp; and
    in response to determining whether the time is less than the most-recent minimum read timestamp, generating a trigger to execute the clean-up entry to free-up the first portion of the memory.

4. The computer-implemented method of claim 3, further comprising:
    attaching the clean-up entry to a next subsequent transaction in response to determining that the time is not less than the most-recent minimum read timestamp.

5. The computer-implemented method of claim 3, wherein the most-recent minimum read timestamp is a lowest read timestamp of all executing transactions in the database system.

6. The computer-implemented method of claim 3, wherein the time is equal to a commit timestamp of a last-committed parallel transaction.

7. The computer-implemented method of claim 1, wherein the first data structure comprises a hash map or vector.

8. A system for providing a lock-free read access to one or more data structures in a database system, comprising:
    one or more memories; and
    at least one processor each coupled to at least one of the memories and configured to perform operations comprising:
        allocating a first portion of a memory corresponding to a first data structure of the one or more data structures;
        generating a first container comprising a first pre-generated iterator and the first data structure;
        determining that an increase of a size of the first data structure is needed;
        generating a modified first data structure based on the determining;
        generating a second container comprising a second pre-generated iterator and the modified first data structure;
        allocating a second portion of the memory corresponding to the modified first data structure, wherein the second portion of the memory is different from the first portion of the memory;
        duplicating first data from the first portion of the memory to the second portion of the memory;
        executing garbage collection to free-up the first portion of the memory based on at least one parallel operation associated with the first data structure; and
        switching between the first container and the second container, thereby providing the lock-free read access to the first data structure or the modified first data structure.

9. The system of claim 8, wherein the database system comprises a transaction manager and a clean-up manager.

10. The system of claim 9, wherein the operation of the executing garbage collection to free-up the first portion of the memory based on the at least one parallel operation comprises:
    determining a delete operation associated with the first portion of the memory;
    in response to the delete operation, inserting a clean-up entry in the transaction manager, the transaction manager delegating the clean-up entry to the clean-up manager;
    attaching the clean-up entry to a subsequent transaction in order to determine and to assign a time to the clean-up entry that is used to subsequently trigger garbage collection, wherein the time is associated with the at least one parallel operation, and a pendency of the clean-up entry is maintained until the at least one parallel operation is executed;

determining whether the time is less than a most-recent minimum read timestamp; and in response to determining whether the time is less than the most-recent minimum read timestamp, generating a trigger to execute the clean-up entry to free-up the first portion of the memory.

11. The system of claim 10, the operations further comprising:

attaching the clean-up entry to a next subsequent transaction in response to determining that the time is not less than the most-recent minimum read timestamp.

12. The system of claim 10, wherein the most-recent minimum read timestamp is a lowest read timestamp of all executing transactions in the database system.

13. The system of claim 10, wherein the time assigned to the clean-up entry is equal to a commit timestamp of a last-committed parallel transaction.

14. The system of claim 8, wherein the first data structure comprises a hash map or vector.

15. A non-transitory computer-readable medium having instructions stored thereon that, when executed by at least one computing device, cause the at least one computing device to perform operations comprising:

allocating a first portion of a memory corresponding to a first data structure of one or more data structures in a database system;

generating a first container comprising a first pre-generated iterator and the first data structure;

determining that an increase of a size of the first data structure is needed;

generating a modified first data structure based on the determining;

generating a second container comprising a second pre-generated iterator and the modified first data structure;

allocating a second portion of the memory corresponding to the modified first data structure, wherein the second portion of the memory is different from the first portion of the memory;

duplicating first data from the first portion of the memory to the second portion of the memory;

executing garbage collection to free-up the first portion of the memory based on at least one parallel operation associated with the first data structure; and switching between the first container and the second container, thereby providing a lock-free read access to the first data structure or the modified first data structure.

16. The non-transitory computer-readable medium of claim 15, wherein the database system comprises a transaction manager and a clean-up manager.

17. The non-transitory computer-readable medium of claim 16, wherein the operation of the executing garbage collection to free-up the first portion of the memory based on the at least one parallel operation comprises:

determining a delete operation associated with the first portion of the memory;

in response to the delete operation, inserting a clean-up entry in the transaction manager, the transaction manager delegating the clean-up entry to the clean-up manager;

attaching the clean-up entry to a subsequent transaction in order to determine and to assign a time to the clean-up entry that is used to subsequently trigger garbage collection, wherein the time is associated with the at least one parallel operation, and a pendency of the clean-up entry is maintained until the at least one parallel operation is executed;

determining whether the time is less than a most-recent minimum read timestamp; and in response to determining whether the time is less than the most-recent minimum read timestamp, generating a trigger to execute the clean-up entry to free-up the first portion of the memory.

18. The non-transitory computer-readable medium of claim 17, the operations further comprising:

attaching the clean-up entry to a next subsequent transaction in response to determining that the time is not less than the most-recent minimum read timestamp.

19. The non-transitory computer-readable medium of claim 17, wherein the most-recent minimum read timestamp is a lowest read timestamp of all executing transactions in the database system.

20. The non-transitory computer-readable medium of claim 17, wherein the time is equal to a commit timestamp of a last-committed parallel transaction.

* * * * *